(12) United States Patent
Lallouet et al.

(10) Patent No.: US 12,068,567 B2
(45) Date of Patent: Aug. 20, 2024

(54) ELECTRICALLY CONNECTING DEVICE FOR SUPERCONDUCTING WIRES

(71) Applicant: NEXANS, Courbevoie (FR)

(72) Inventors: Nicolas Lallouet, Baincthun (FR); Loïc Legrand, Audruicq (FR); Sébastien Delplace, Loon-Plage (FR)

(73) Assignee: NEXANS, Courbevoie (FR)

( * ) Notice: Subject to any disclaimer, the term of this patent is extended or adjusted under 35 U.S.C. 154(b) by 341 days.

(21) Appl. No.: 17/518,564

(22) Filed: Nov. 3, 2021

(65) Prior Publication Data

US 2022/0181800 A1 Jun. 9, 2022

(30) Foreign Application Priority Data

Nov. 10, 2020 (FR) .................................... 20 11504

(51) Int. Cl.
*H01R 4/00* (2006.01)
*H01B 12/08* (2006.01)
*H01B 12/16* (2006.01)
*H01R 4/02* (2006.01)
*H01R 4/68* (2006.01)

(52) U.S. Cl.
CPC ............ *H01R 4/68* (2013.01); *H01B 12/08* (2013.01); *H01B 12/16* (2013.01); *H01R 4/021* (2013.01)

(58) Field of Classification Search
CPC .......... H01R 4/68; H01R 4/021; H01B 12/08; H01B 12/16
See application file for complete search history.

(56) References Cited

U.S. PATENT DOCUMENTS

| 5,051,397 A | 9/1991 | Sato et al. |
| 6,353,198 B1 | 3/2002 | Tong et al. |
| 6,844,064 B1 | 1/2005 | Ayai et al. |
| 2005/0236175 A1* | 10/2005 | Reis ............... H01B 12/06 |
| | | 174/125.1 |
| 2012/0214675 A1* | 8/2012 | van der Laan .... H10N 60/0268 |
| | | 505/433 |
| 2013/0244881 A1* | 9/2013 | Roden ............... H01B 12/16 |
| | | 174/15.5 |

FOREIGN PATENT DOCUMENTS

| EP | 2 375 504 | 10/2011 |
| JP | H10 247533 | 9/1998 |

OTHER PUBLICATIONS

International search report dated Jul. 15, 2021.

* cited by examiner

*Primary Examiner* — Pete T Lee
(74) *Attorney, Agent, or Firm* — Sofer & Haroun, LLP

(57) ABSTRACT

An electrically connecting device (1) includes a linking part defining an internal channel (12) that opens onto the exterior of the linking part. The internal channel (12) is able to receive two end segments of two superconducting wires (2, 3) that lie parallel in the internal channel (12) over a segment of common length; and an aperture (13) in the external jacket of the linking part. The aperture (13) is in communication with the internal channel (12) in order to allow a brazing material in liquid form to be inserted into the internal channel (12) around the two end segments of the two superconducting wires (2, 3).

14 Claims, 4 Drawing Sheets

ELECTRICALLY CONNECTING DEVICE FOR SUPERCONDUCTING WIRES

RELATED APPLICATION

This application claims the benefit of priority from French Patent Application No. 20 11504, filed on Nov. 10, 2020, the entirety of which is incorporated by reference.

TECHNICAL FIELD

The present invention relates to the general field of superconducting cable-based circuits, and more precisely to an electrically connecting device able to connect two superconducting wires.

TECHNOLOGICAL BACKGROUND

A superconducting cable allows large electrical currents to be transported with a cable of cross section that is far smaller than that of a conventional cable made of a resistive electrical conductor, while limiting electrical losses along the cable, and especially losses due to Joule heating, since this effect is extremely weak in superconductors.

A superconducting cable is conventionally made of at least one central superconducting wire encircled by a cryogenic jacket. The cryogenic jacket comprises, for example, two concentric jackets that are thermally insulated from one each other by a vacuum. A coolant, such as helium or nitrogen, in liquid or gaseous form, contained inside the cryogenic jacket, cools the central superconducting wire to a temperature below the so-called critical temperature at which this wire becomes superconducting.

There are a great many situations in which it is necessary to electrically connect two superconducting wires of one or more superconducting cables:

It is for example known to use cable-based circuits composed of a plurality of superconducting cables connected to one another in series, to transport large currents over a long distance. Connectors must therefore be used at each junction between two successive cables.

Other superconducting cable-based circuits for forming superconducting closed loops generating strong magnetic fields are known. Such a superconducting loop may, for example, be used, as especially described in document EP 2 732 075 B1, as a secondary electric circuit in an aluminium smelter, to compensate for the magnetic field created by a main electric circuit transporting an electrolysis current fed to a series of electrolysis cells intended to produce aluminium and forming one or more lines. To produce this type of superconducting loop, it is known to use a superconducting cable comprising, in a single cryogenic jacket, a superconducting wire wound into a plurality of turns, the wire being composed either of a single superconducting wire, or of a succession of elementary superconducting wires connected in series, each elementary wire forming one turn of the winding. In this type of superconducting loop, a first end of the superconducting wire (or of the elementary wire that forms the first turn) and a second end of the superconducting wire (or of the elementary wire that forms the last turn) need to be electrically connected to the two electric poles of an electrical power source that delivers a predetermined supply current. The number of turns made by the superconducting wire (or the number of elementary superconducting wires that are connected in series) depends on the magnitude of the supply current and on the strength of the magnetic field that it is desired to generate. By way of nonlimiting example, a superconducting loop comprising a superconducting wire wound into 21 turns passing side-by-side inside the single cryogenic jacket (or 21 elementary superconducting wires connected in series) and supplied with a current of 5 kA, is able to generate a magnetic field corresponding to 105 kA. Superconducting-loop versions in which the superconducting wire wound into a plurality of turns is composed of a succession of elementary superconducting wires each forming one turn of the winding are preferred to those using a single superconducting wire. Specifically, these versions, although they require a plurality of connectors to connect the successive elementary superconducting wires in series, allow, during the manufacture of the superconducting loop, complex handling operations and excessive bending of the elementary superconducting wires, which could lead to a loss of effectiveness of the electrical properties of these wires, to be avoided.

The applicant has already developed techniques for connecting superconductors using brazing with a tin alloy. These known techniques require the use of an external piece of heating equipment the bulk of which is far too large to be used for a circuit in which a plurality of connections must be made in a given vicinity.

In other known types of connection, two cables are connected to each other end-to-end: the ends of the two cables are placed facing each other and covered with a brazing material. End-to-end connection is nevertheless unsuitable in the case where the superconducting wires must convey large currents because it generates resistive losses that are too large.

SUMMARY OF THE INVENTION

The aim of the present invention is to provide a device for connecting two superconducting wires that allows resistive losses to be limited. Another aim of the invention is to simplify the process of connecting two superconducting wires. Another aim of the invention is to provide a connecting device that is as compact as possible.

One subject of the present invention is an electrically connecting device comprising:
  a linking part defining an internal channel that opens onto the exterior of the linking part, said internal channel being able to receive two end segments of two superconducting wires; and
  an aperture in the external jacket of the linking part, said aperture being in communication with said internal channel in order to allow a brazing material in liquid form to be introduced into said internal channel around the two end segments of the two superconducting wires,
characterized in that the linking part comprises a central elongate body (10), the internal channel (12) extending in a straight line between a first open end (11a) and a second open end (11b) of the linking part, said ends being located on either side of the central elongate body (10), in that said internal channel (12) is configured so that the two end segments of two superconducting wires (2, 3) lie parallel and in contact with each other in the internal channel (12) over said segment of common length, and in that the internal channel (12) has in cross section the shape of an eight.

The linking part is preferably of integral construction and made of an electrically conductive material that is able to withstand a cryogenic temperature. The linking part is for example made of copper.

In possible embodiments, said aperture is a slit extending over the central elongate body, parallel to the internal channel.

In the possible embodiments, the dimension of the cross section of the shape of an eight is preferably substantially adjusted to the dimensions of the cross sections of the two end segments of the two superconducting wires.

In these embodiments, the first open end and the second open end may have an elongate cross section concentric with the cross section of the shape of an eight of the internal channel.

The electrically connecting device preferably further comprises two heat-shrinkable sleeves that are configured to sealably encircle the transition regions of two superconducting wires inserted into the first open end and the second open end.

In possible embodiments, the central elongate body is cylindrical.

The first open end and the second open end may advantageously be located on either side of the central elongate body so that the internal channel is off-centre with respect to a longitudinal axis of the central elongate body.

In this case, the central elongate body may comprise an additional channel lying parallel to the internal channel and opening onto the exterior at at least one of the two ends of the central elongate body.

The additional channel may be configured to receive a heating cartridge.

The additional channel preferably opens onto the exterior at both ends of the central elongate body.

The internal channel is preferably positioned between said aperture and said additional channel.

Another subject of the present invention is a superconducting cable-based electrical circuit able to form a closed superconducting electrical loop comprising a superconducting cable comprising a plurality of superconducting elementary wires that extend longitudinally inside a cryogenic jacket, the superconducting elementary wires being connected in series by a plurality of electrically connecting devices according to the invention so as to each form one turn of the superconducting electrical loop.

BRIEF DESCRIPTION OF THE FIGURES

The following description provided with reference to the appended drawings, which are given by way of non-limiting example, will make it easy to understand what the invention consists of and how it may be implemented. In the appended figures.

DESCRIPTION OF ONE OR MORE EMBODIMENTS

In the figures, identical or equivalent elements will bear the same reference signs. The various diagrams are not to scale.

Throughout the description, what is meant by superconducting wire (or by elementary superconducting wire) is any longitudinal superconducting element or comprising a longitudinal core made of metal (for example copper) encircled by at least one superconducting layer (formed for example from a plurality of superconducting wires or tapes encircling the copper core).

Figure 1:
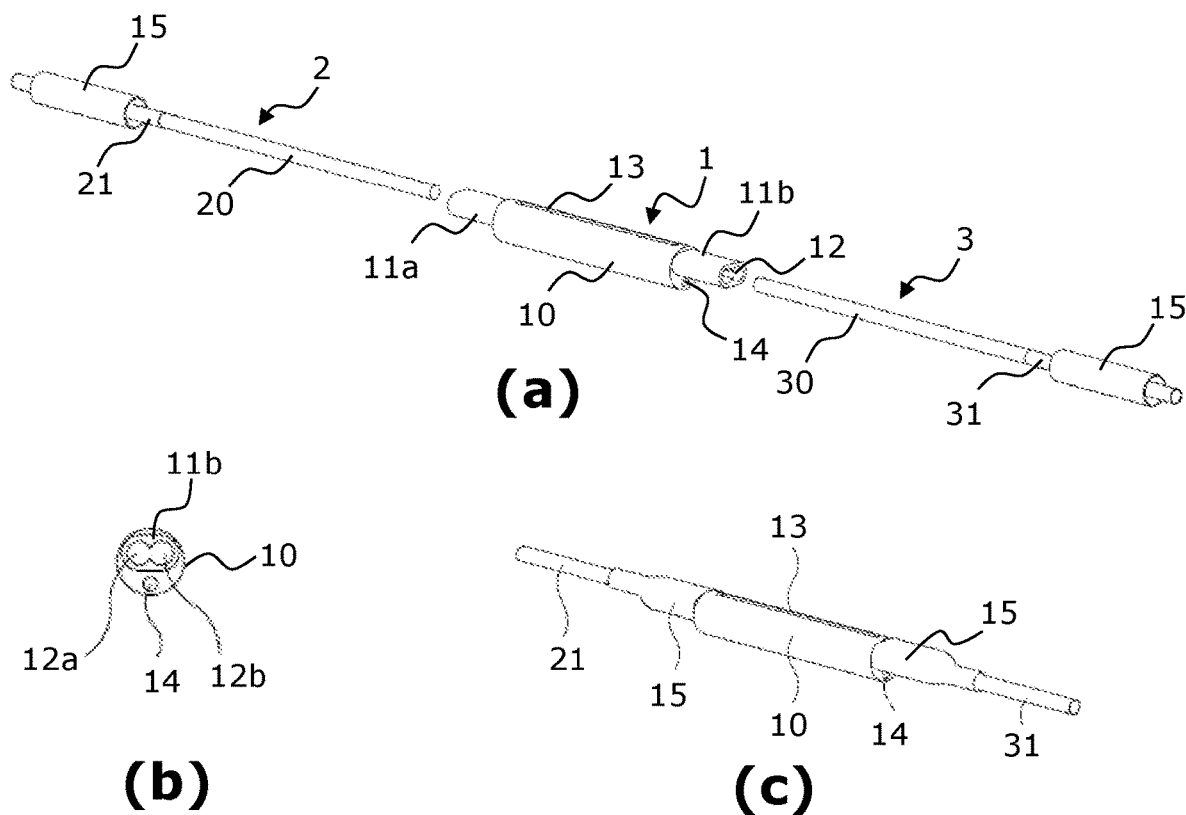
FIG. 1 schematically illustrates various views showing an operation of connecting two superconducting wires by means of an electrically connecting device according to one possible embodiment of the invention.

FIG. 1 schematically illustrates one possible embodiment of an electrically connecting device 1 according to the invention, said device being intended to connect two superconducting wires 2, 3. More precisely, view (a) illustrates the connecting device 1 in an operation of connecting two end segments of the two superconducting wires 2, 3, view (b) illustrates a face-on view of one end of the connecting device 1, and view (c) illustrates the result obtained after connection of the two superconducting wires 2, 3 by means of the electrically connecting device 1.

In the nonlimiting example shown, each superconducting wire 2, 3, respectively, comprises a longitudinal superconducting element 20, 30, respectively, (or, as indicated above, a longitudinal metal core encircled by a superconducting layer) that is optionally encircled by an electrically insulating layer 21, 31, respectively. It should be noted that, in the case of presence of insulating layers 21, 31, the end segments of the wires 2, 3 will have to be stripped beforehand to expose the longitudinal superconducting elements 20, 30 that will be connected together by way of the electrically connecting device 1.

As may more particularly be seen in view (a) of FIG. 1, the electrically connecting device 1 comprises a linking part defining an internal channel 12 that opens onto the exterior of the linking part. The linking part is made of electrically conductive material able to withstand a cryogenic temperature in order that the connecting device 1 may be placed, with the two superconducting wires that it connects, into any cryogenic jacket or casing inside of which a cryogenic fluid is capable of flowing. The linking part is preferably made of copper, if possible high-purity copper (for example Cu-c2), in order to minimize its electrical resistance at cryogenic temperatures.

The internal channel 12 is configured to receive the two end segments of the two superconducting wires 2, 3, stripped beforehand where appropriate, so that these end segments may lie parallel, and preferably make contact with each other, in the internal channel 12, over a segment of common length.

In the nonlimiting embodiment illustrated in FIG. 1, the linking part comprises a central elongate body 10, for example of cylindrical shape, and a first open end 11a and a second open end 11b that are located on either side of the central elongate body 10. The internal channel 12 advantageously extends in a straight line between the first open end 11a and the second open end 11b of the linking part. This allows the end segments of the superconducting wires 2, 3 to be introduced by rectilinear sliding into the internal channel without folding the wires, which would risk damaging these wires. The end segments here make contact over a segment of common length corresponding as much as possible to the length of the internal channel 12.

The electrically connecting device 1 also comprises an aperture 13 in the external jacket of the linking part. This aperture 13 is in communication with the internal channel 12, and thus allows a brazing material to be introduced in liquid form into the internal channel 12 around the two end segments of the two superconducting wires 2, 3 inserted into the channel. In the nonlimiting example shown, the aperture 13 is a slit that extends over the central elongate body 10, parallel to the internal channel 12, this promoting rapid filling of the internal channel by the brazing material in liquid form.

As more particularly visible in view (b) of FIG. 1, the internal channel 12 preferably has a cross section in the shape of an eight, said cross section for example being obtained by joining two through-holes 12a, 12b that communicate with each other over their entire length. The linking part, i.e. the central body 10 provided with the two open ends 11a, 11b, is preferably of integral construction, this allowing the internal channel 12 to be obtained by drilling the part from one end to the other through the central body 10 to produce the two through-holes 12a, 12b.

The dimension of the cross section of the shape of an eight of the internal channel 12 is furthermore preferably substantially adjusted to the dimensions of the cross sections of the two end segments of the two superconducting wires 2, 3. This not only makes it possible to guarantee that the segments of wires indeed make contact with each other in the internal channel 12 before the brazing operation, but also to decrease the amount of brazing material in liquid form required to fill the internal channel 12. This is even more important if the brazing material used, which is preferably tin or a tin alloy, possesses a resistivity higher than copper at cryogenic temperatures.

In the nonlimiting example illustrated in FIG. 1, the first open end 11a and the second open end 11b have an elongate cross section concentric with the cross section of the shape of an eight of the internal channel 12 (see especially the views (a) and (b)). The electrically connecting device 1 further comprises two heat-shrinkable sleeves 15 that are configured to sealably encircle the transition regions of two superconducting wires inserted into the first open end 11a and the second open end 11b. By virtue of the elongate cross section of each open end 11a and 11b, each heat-shrinkable sleeve 15 covers the transition region while perfectly cleaving to the shape of the open ends 11a and 11b, and of the superconducting wires 2 and 3, as most particularly visible in view (c) of FIG. 1. The internal channel 12 may thus be sealably closed at both its ends (corresponding to the open ends 11a and 11b) once the ends of the superconducting wires have been introduced into the channel up to their brazing position, guaranteeing filling without loss of the internal channel 12 by the brazing material in liquid form. In the nonlimiting case where the superconducting wires 2 and 3 comprise an insulating cladding 21, 31, respectively, the heat-shrinkable sleeves 15 are advantageously dimensioned to extend up to unstripped portions of the superconducting wires. As a variant, the ends of the superconducting wires are stripped only over a length corresponding to the length of insertion into the internal channel 12.

In the nonlimiting embodiment illustrated in FIG. 1, it will be noted that the first open end 11a and the second open end 11b are located on either side of the central elongate body 10 so that the internal channel 12 is off-centre with respect to a longitudinal axis of the central elongate body 10. In other words, the axis along which the central channel 12 extends is not coincident but parallel to the longitudinal axis of the central elongate body 10. This specific arrangement makes it possible to provide, inside the central elongate body 10, an additional channel 14 that extends parallel to the internal channel 12 and that opens onto the exterior at at least one of the two ends of the central elongate body 10. This additional channel 14, which is for example obtained by drilling the central elongate body 10, may advantageously be dimensioned to accommodate a heating cartridge (not shown) used at the moment of the operation of brazing the ends of the two superconducting wires inserted into the internal channel 12 in order to convert the brazing material to liquid form at a temperature above its melting point. In the embodiment illustrated, the additional channel 14 opens onto the exterior at both ends of the central elongate body 10. This allows the extraction of the heating cartridge after use to be facilitated. Such an additional through-channel 14 further allows any coolant, to the flow of which the connecting device 1 may be subjected, to pass through the additional channel 14, and to thus contribute to the effectiveness of the cooling of the device 1 and of the segments of superconducting wires contained in the central channel 12.

The internal channel 10 is preferably positioned between the aperture 13 and the additional channel 14 (see view (a) of FIG. 1).

The connecting device 1 such as illustrated in FIG. 1 may be used in two ways to connect two ends of superconducting wires:

A first method for electrically connecting two superconducting wires 2, 3 by means of the electrically connecting device 1 according to the embodiment illustrated in FIG. 1 essentially comprises the following steps:

a. the connecting device 1 is positioned so that the central elongate body 10 extends substantially horizontally, with the filling aperture 13 oriented upwards (see view (a) of FIG. 1).

b. the shrinkable sleeves 15 are positioned beforehand around each end of the two superconducting wires 2, 3 to be connected;

c. when the superconducting wires comprise an insulating cladding, such as the claddings 21 and 31, the end segments of these wires are stripped so as to expose the superconducting portion 20, 30 of the wires, over a length preferably corresponding to the length of insertion into the internal channel 12;

d. the end segment 20 of the first superconducting wire 2 is introduced longitudinally into one of the holes 12a, 12b forming the internal channel 12 via the first open end 11a; likewise, the end segment 30 of the second superconducting wire 3 is introduced longitudinally into the other of the holes 12a, 12b forming the internal channel 12 via the second open end 11b. At the end of this step, these two segments lie parallel and make contact with each other in the internal channel 12 over a segment of common length (corresponding at most to the longitudinal length of the internal channel 12);

e. each heat-shrinkable sleeve 15 is then repositioned on the open ends 11a, 11b so as to guarantee a seal-tight transition region (see view (c) of FIG. 1);

f. a heating cartridge is placed inside the additional channel 14;

g. the internal channel 12 is filled, via the aperture 13, with a brazing material in liquid form;

h. the heating cartridge is activated; and i. preferably the heating cartridge is removed after the brazing operation.

In the first method described above, certain steps may be interchanged or carried out in parallel. This is especially the case of steps b and c, or even of step f.

In a second connecting method, the two end segments 20, 30 are inserted into the central channel 12 via the same open end, for example the first end 11a. In this case, only steps b, d and e described above differ slightly. In particular, in steps b and e, only one heat-shrinkable sleeve 15 is positioned beforehand around the two end segments 20, 30, before the step of introducing two wires into the central channel 12, then repositioned so as to cover, in this example, the first open end 11a and the two wires to guarantee seal-tightness. A plug is used to close the second open end 11b. This plug may be a heat-shrinkable plug. As a variant, the plug may be a machined metal plug, which is for example made of copper, and covered at its junction with a Kapton tape or with another heat-shrinkable material.

As described indicated above, the electrically connecting device according to the mention allows resistive losses in the connection to be optimized. It also allows superconducting wires to be connected much more rapidly and at lower cost than known connectors. In addition, the process of connecting the superconducting wires using this device requires few operations that run the risk of being detrimental to the effectiveness of these superconducting wires. The connecting device further allows a satisfactory cooling of the connection to be guaranteed by improving the flow of a cryogenic fluid.

Moreover, the electrically connecting device is very compact. By way of nonlimiting example, to connect two cylindrical superconducting wires of 10 mm diameter, provision may be made for the following dimensions:

length of the central channel 12: about 250 mm.

diameter of each channel 12a/12b forming the central channel 12: about 11 mm.

segment of minimum common length in the connector: at least 100 mm.

length of the central body 10: about 150 mm.

diameter of the central body 10: about 30 mm.

In the case where the superconducting wires to be connected comprise a plurality of superconducting wires or strips twisted with a given pitch, the segment of common length is preferably at least equal to this pitch. In this case it is guaranteed that each unitary superconducting wire or strip is able to transmit directly into the connector via contact with all the other unitary wires or strips.

Figure 2:
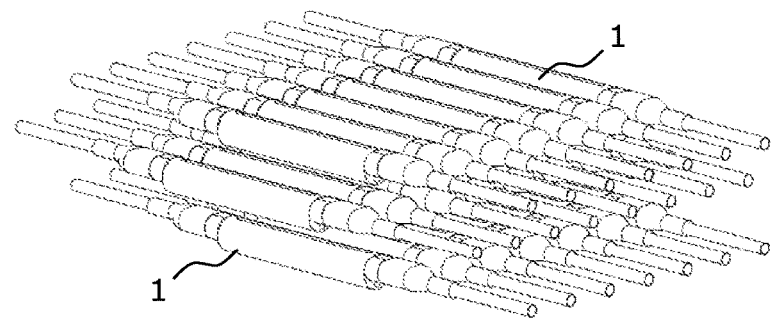
FIG. 2 illustrates an arrangement in which a plurality of pairs of superconducting wires are connected by means of a plurality of electrically connecting devices according to the invention.

As the total bulk of the connecting device 1 but also the space required to achieve connection of two superconducting wires via this device are optimized, it is possible to make in parallel a high number of connections of pairs of superconducting wires in a minimum total space. FIG. 2 illustrates a nonlimiting example of arrangement of twenty-two connecting devices 1 each connecting two superconducting wires. The twenty-two devices 1 may be divided into three groups, in particular:

a first group of seven electrically connecting devices 1 positioned parallel to one another in an upper horizontal plane;

a second group of eight electrically connecting devices 1 positioned parallel to one another in an intermediate horizontal plane; and a third group of seven electrically connecting devices 1 positioned parallel to one another in a lower horizontal plane.

In this arrangement, the devices 1 distributed in two consecutive horizontal planes are furthermore preferably offset vertically pairwise. This makes it possible to make the apertures of each device 1 accessible, and hence it is possible to fill, preferably simultaneously, the central channel of each device with the brazing material in liquid form. Furthermore, this simplifies the connection of the heating cartridges. The latter may for example be connected to a single control device (not shown) allowing, sequentially or simultaneously, the activation of the heating cartridges to be triggered.

Whatever the way in which two superconducting wires are electrically connected to each other (using a connecting device according to the invention or any other known connector), it is very advantageous to be able to connect pairwise a high number of superconducting wires in the arrangement illustrated in FIG. 2, i.e. in one or more horizontal planes, in particular when it is desired to produce a closed superconducting loop generating high magnetic fields for the reasons that will now be described in detail.

Non limitingly, by way of concrete example, below it is considered that it is desired to produce a closed superconducting loop comprising a superconducting wire wound into twenty-one turns passing side-by-side inside a single cryogenic jacket, the superconducting wire resulting from connection in series of twenty one elementary superconducting wires each forming one turn.

Figure 3:
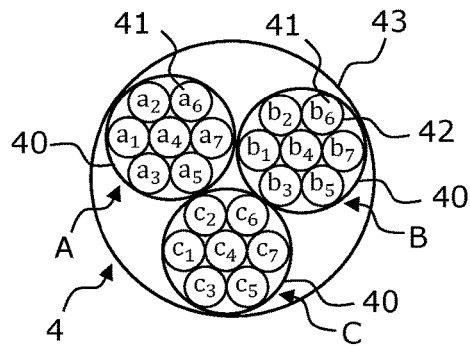
FIG. 3 illustrates a cross-sectional view of one end of an example of a cable comprising three sub-cables for producing a superconducting loop.

To do this, a superconducting cable such as the cable 4 illustrated in cross section in FIG. 3 (without its cryogenic envelope) is advantageously used. The superconducting cable 4 comprises, in this example, three modules or sub-cables A, B, C each comprising, within a mechanical holding jacket 40, seven elementary superconducting wires 41, which are preferably identical, and which are intended to form the twenty-one turns of the superconducting loop. Each of the elementary superconducting wires 41 comprises a superconducting longitudinal element (or, as indicated above, a longitudinal metal core encircled by a superconducting layer) that is encircled by an electrically insulating layer 42. The three sub-cables A, B, C are preferably twisted with one another to form a twisted triplet and encircled by an overall mechanical jacket 43 for holding the three sub-cables, which is optionally electrically insulating. The entire thing is encircled by a cryogenic jacket (not shown) inside of which a cooling fluid may be made to flow.

Below, to simplify the explanations of the connecting scheme:

the ends shown in FIG. 3 of the seven elementary superconducting wires 41 of the sub-cable A have been denoted $a_1$ to $a_7$;

the other ends (not shown in FIG. 3) of the seven elementary superconducting wires 41 of the sub-cable A have been denoted $a'_1$ to $a'_7$;

the ends shown in FIG. 3 of the seven elementary superconducting wires 41 of the sub-cable B have been denoted $b_1$ to $b_7$;

The other ends (not shown in FIG. 3) of the seven elementary superconducting wires 41 of the sub-cable B have been denoted $b'_1$ to $b'_7$;

the ends shown in FIG. 3 of the seven elementary superconducting wires 41 of the sub-cable C have been denoted $c_1$ to $c_7$;

the other ends (not shown in FIG. 3) of the seven elementary superconducting wires 41 of the sub-cable C have been denoted $c'_1$ to $c'_7$;

each elementary superconducting wire may thus be represented by a pair formed by its two ends $(a_i\text{-}a'_i)$, $(b_i\text{-}b'_i)$ or $(c_i\text{-}c'_i)$, the integer i varying from 1 to 7.

All the elementary superconducting wires will have to be successively connected to one another, for example according to the following series: $\{t_1\text{-}(a_1\text{-}a'_1)\text{-}(a_2\text{-}a'_2)\text{-}(a_3\text{-}a'_3)\text{-}(a_4\text{-}a'_4)\text{-}(a_5\text{-}a'_5)\text{-}(a_6\text{-}a'_6)\text{-}(b_1\text{-}b'_1)\text{-}(b_2\text{-}b'_2)\text{-}(b_3\text{-}b'_3)\text{-}(b_4\text{-}b'_4)\text{-}(b_5\text{-}b'_5)\text{-}(b_6\text{-}b'_6)\text{-}(b_7\text{-}b'_7)\text{-}(c_1\text{-}c'_1)\text{-}(c_2\text{-}c'_2)\text{-}(c_3\text{-}c'_3)\text{-}(c_4\text{-}c'_4)\text{-}(c_5\text{-}c'_5)\text{-}(c_6\text{-}c'_6)\text{-}(c_7\text{-}c'_7)\text{-}t_2\}$ in which $t_1$ and $t_2$ are the ends of two wires for connecting to two supply terminals by virtue of which an electrical current will be able to flow through the closed superconducting loop.

It will be noted that, for reasons that will be better understood below, series connection of all the elementary wires belonging to the same sub-cable A, B or C will advantageously be privileged.

To be able to connect each of the elementary wires according to the above series is it necessary to open the cable 4 at each of its ends, then to open each sub-cable A, B, C in order to separate each end of each elementary superconducting wire 41. This separating operation must be carried out in such a way as to not degrade the superconducting properties of the elementary superconducting wires. Specifically, superconducting wires are more fragile than standard wires of resistive conductor and must absolutely respect a given radius of curvature. It is therefore absolutely necessary to guide the elementary superconducting wires 41.

Moreover, the elementary superconducting wires 41 must be guided in such a way that the ends of the elementary superconducting wires 41 to be connected may be placed facing connectors (such as the one described with reference to FIG. 1), all the required connectors furthermore needing to be concentrated in the smallest possible space so as to be able to be contained in a cryogenic junction box of reasonable size and able moreover to manage the flow of a coolant in the superconducting loop in question.

Lastly, on account of the fact that the current in the system will generate magnetic forces between each elementary superconducting wire that are proportional to the current, it is preferable to make provision for these forces to be supported at every point along the chain extending from each end of the cable 4 to the connectors.

Figure 4:
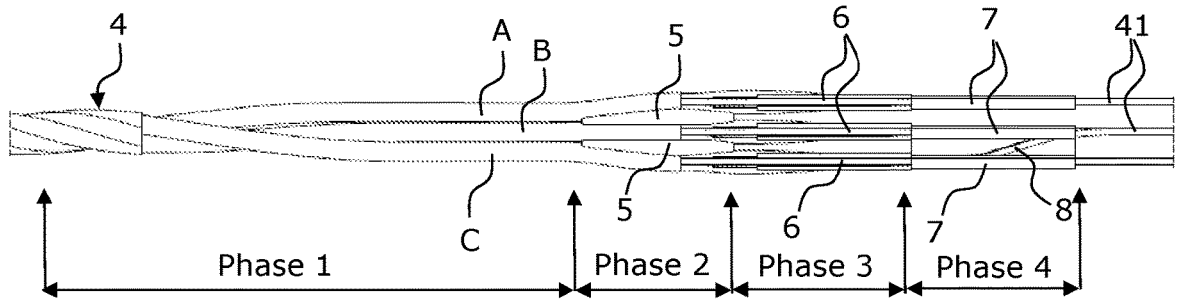
FIG. 4 illustrates the principle of conversion of one end of the cable of FIG. 3 into an arrangement allowing the connection in series of elementary superconducting wires of the cable.
Figure 5:
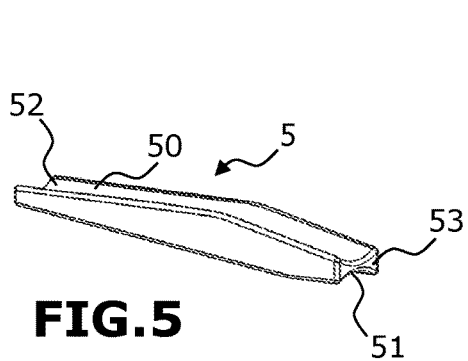
FIG. 5 illustrates a guiding first part used in the conversion according to the principle of FIG. 4.
Figure 6:
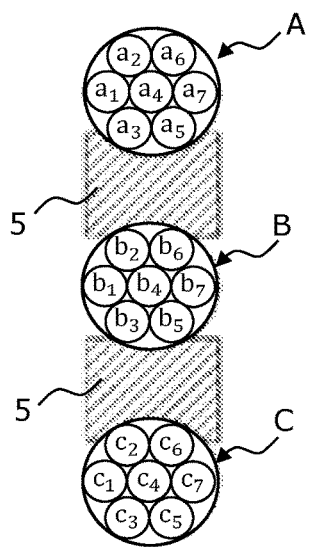
FIG. 6 schematically illustrates a first intermediate arrangement of the three sub-cables obtained in the conversion according to the principle of FIG. 4.
Figure 7:
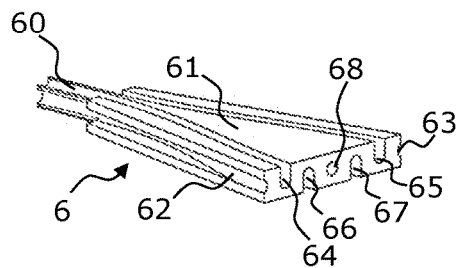
FIG. 7 illustrates a guiding and holding second part used in the conversion according to the principle of FIG. 4.
Figure 8:
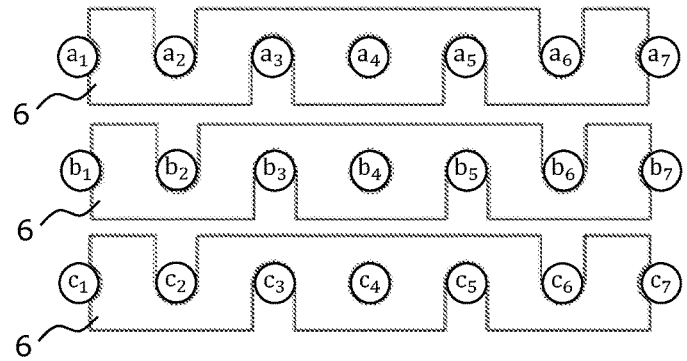
FIG. 8 schematically illustrates a second intermediate arrangement of elementary wires from which the sub-cables are composed, said arrangement being obtained in the conversion according to the principle of FIG. 4.
Figure 9:
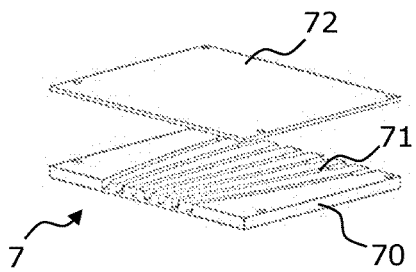
FIG. 9 illustrates a third guiding and holding part used in the conversion according to the principle of FIG. 4.

The principle of an innovative system for guiding elementary superconducting wires 41 allowing all of the above requirements to be met will now be described with reference to FIGS. 4 to 11. In particular, FIG. 4 summarizes in schematic form the various steps implemented to allow conversion of one end of the cable 4 into a plurality of elementary superconducting wires 41 able to be connected pairwise (it will be understood that the same conversion is reproduced at the other end of the cable 4). FIGS. 5, 7 and 9 illustrate certain elements of the guiding system that are required for this conversion, and FIGS. 6, 8, 10 and 11 assist with understanding the relative positioning of the elementary superconducting wires 41 in various steps of the conversion. As was seen above with reference to the advantage achieved by the arrangement of FIG. 2, the general principle of the innovative guiding system consists in making it so that, for each sub-cable A, B and C of the cable 4, the elementary superconducting wires from which the sub-cable is composed are separated then guided so as to be arranged in a horizontal plane, the horizontal planes obtained for the three sub-cables A, B and C superposing.

With reference to FIG. 4 (which is to be read from left to right), a first operation (Phase 1) consists in removing the cryogenic jacket and the overall holding jacket 43 of the three sub-cables A, B, C of the cable 4 over a segment of length of the end of the cable 4 so as to make the corresponding segments of the sub-cables A, B and C accessible. These segments of sub-cables A, B and C are untwisted and placed in contact with one another along a vertical axis. Thus a radius of curvature that does not degrade the electrical properties of the sub-cables is respected.

A second operation (Phase 2) consists in vertically separating the segments of sub-cables A, B, C from one another in order to create sufficient space to subsequently make the various connections. To do this, two specific guiding first parts 5 are preferably used, the preferred shape of which, illustrated in FIG. 5, comprises two concave and opposite grooves 50, 51 that are each suitable for receiving one segment of one of the sub-cables A, B or B, C, each groove extending between an entrance end 52 for the corresponding sub-cable and an exit end 53 for the corresponding sub-cable of the guiding first part 5. Each guiding first part 5 is preferably made of an electrically insulating material able to withstand the cryogenic temperature. For example, a specific fibre-reinforced polymer, such as G-10, could be used. The two concave grooves 50, 51 are machined to preferably follow the diameter of the sub-cable A, B or C in the contact region, and to diverge from each other in order to increase the distance vertically separating the two sub-cables that they accommodate. The design of the part 5 (in particular the angle of divergence of the two grooves) must allow the acceptable radius of curvature of the sub-cables to be respected and block as much as possible any movement of each sub-cable. At the end of Phase 2, the segments of sub-cables A, B and C are positioned relative to one another as illustrated in FIG. 6.

In a third operation (Phase 3), the elementary superconducting wires, which are still twisted inside of each segment of sub-cable A, B, C, are then untwisted (after a segment of length of the holding jacket 40 has been removed) and placed in a horizontal plane by virtue of a dedicated guiding and holding second part 6 (one part per sub-cable). Once again, the design of this guiding and holding second part 6 must allow the acceptable radius of curvature of the elementary superconducting wires to be respected throughout this process and at the same time mechanically support these wires in order to decrease as much as possible their potential movement during the subsequent operation of the superconducting loop because of the high magnetic field. A preferred shape of this dedicated guiding and holding second part 6 is illustrated in FIG. 7. It comprises an entrance end 60 held in the continuity of the second end 53 in order to receive the sub-cable A, B or C as it exits from the guiding first parts 5. A frustoconical body 61 that flares out in the horizontal extension of the entrance end 60 comprises seven specific grooves or paths that are able to receive each of the elementary superconducting wires of the corresponding sub-cable A, B or C. In the nonlimiting example, the grooves or paths are advantageously composed of two grooves 62, 63 that open laterally onto the frustoconical body 61, of two grooves 64, 65 that open onto an upper portion of the frustoconical body 61, of two grooves 66, 67 that open onto a lower portion of the frustoconical body 61, and of a central channel 68. The bottom of the grooves 62 to 65 and the centre of the central channel 68 are aligned in the far portion of the frustoconical body 61, which portion is located opposite the entrance end 16. The seven elementary superconducting wires of a sub-cable A, B or C gradually diverge from one another and reach the position illustrated in FIG. 8, which shows, at the end of Phase 3, a cross-sectional view of the exit end segment of the guiding and holding second parts 6 with the corresponding elementary superconducting wires. Each guiding and holding second part 6 is preferably made of an electrically insulating material able to withstand the cryogenic temperature. For example, a specific fibre-reinforced polymer, such as G-10, could be used. Closing plates (not shown) covering each of the surfaces of the frustoconical body may advantageously be used in order to prevent the elementary superconducting wires from exiting the grooves that guide and support them. As may be clearly seen in FIG. 8, the elementary superconducting wires of the sub-cables A, B and C are aligned in three superposed horizontal planes, an upper horizontal plane for the elementary superconducting wires $a_1$ to $a_7$ of the sub-cable A, a lower horizontal plane for the elementary superconducting wires $c_1$ to $c_7$ of the sub-cable C, and an intermediate horizontal plane for the elementary superconducting wires $b_1$ to $b_7$ of the sub-cable B.

In a final step (Phase 4 of FIG. 4), the elementary superconducting wires of each sub-cable A, B and C are separated even further from one another in their respective horizontal plane. Specifically, as the radius of curvature acceptable to the elementary wires may be quite large, the distance required in each guiding and holding second element 6 to sufficiently separate them may be too large to provide in a single element. A guiding and holding third element 7 is used to this end for each sub-cable. As may be seen in FIG. 9, this guiding and holding third element essentially comprises a planar plate 70 comprising seven grooves 71 that open onto the upper portion of the planar plate. On the side of the entrance face of the planar plate 70 (bottom left in FIG. 9), the grooves are spaced apart so as to face the grooves and paths 64 to 68 of the exit face of the guiding and holding second part 6. In other words, each guiding and holding third element 7 lies in the extension of each corresponding guiding and holding second part 6. The grooves then follow a specific trajectory respecting the radius of curvature acceptable to the elementary wires until they are sufficiently separated from one another or, in other words, in order to end up facing the connectors that will be used to connect the elementary wires in series. To avoid any movements of the elementary superconducting wires out of these grooves 71 especially because of the high magnetic field in operation of the superconducting loop, a closing plate 72 is preferably fastened to the upper portion of the plate 70. Once again, each guiding and holding third part 7 is preferably made of an electrically insulating material able to withstand the cryogenic temperature, of G10 for example.

Figure 10:
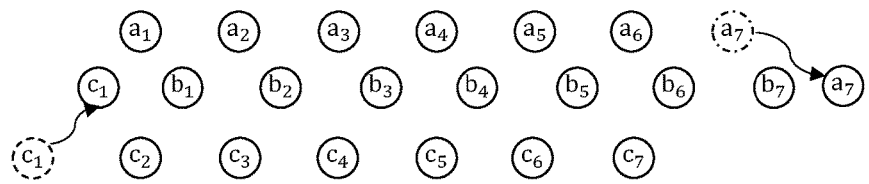
FIG. 10 schematically illustrates a specific phase carried out in the conversion according to the principle of FIG. 4.

To produce a veritable looped circuit, certain of the elementary superconducting wires must be able to change horizontal plane. This is especially the case for the elementary wire $c_1$, which must pass from the lower horizontal plane to the intermediate horizontal plane, and for the elementary wire $a_7$, which must pass from the upper horizontal plane to the intermediate horizontal plane, as schematically illustrated in FIG. 10. Guides comprising a specific groove, i.e. guides such as the guide 8 in FIG. 4, are provided to this end. This guide 8 allows the elementary wire $c_1$ to leave the groove of the upper portion of the guiding third part that is associated therewith (the part level with the lower horizontal plane) to reach from below the guiding plate 70 of the guiding third part associated with the sub-cable B (the part level with the intermediate horizontal plane). Analogously, another of these guides (not shown) allows the elementary wire $a_7$ to leave the groove of the third guiding part that is associated therewith (the part level with the upper horizontal plane) to reach a groove of the third guiding part associated with the sub-cable B (the part level with the intermediate horizontal plane). The guides such as the guide 8 are preferably also made of G10.

Figure 11:
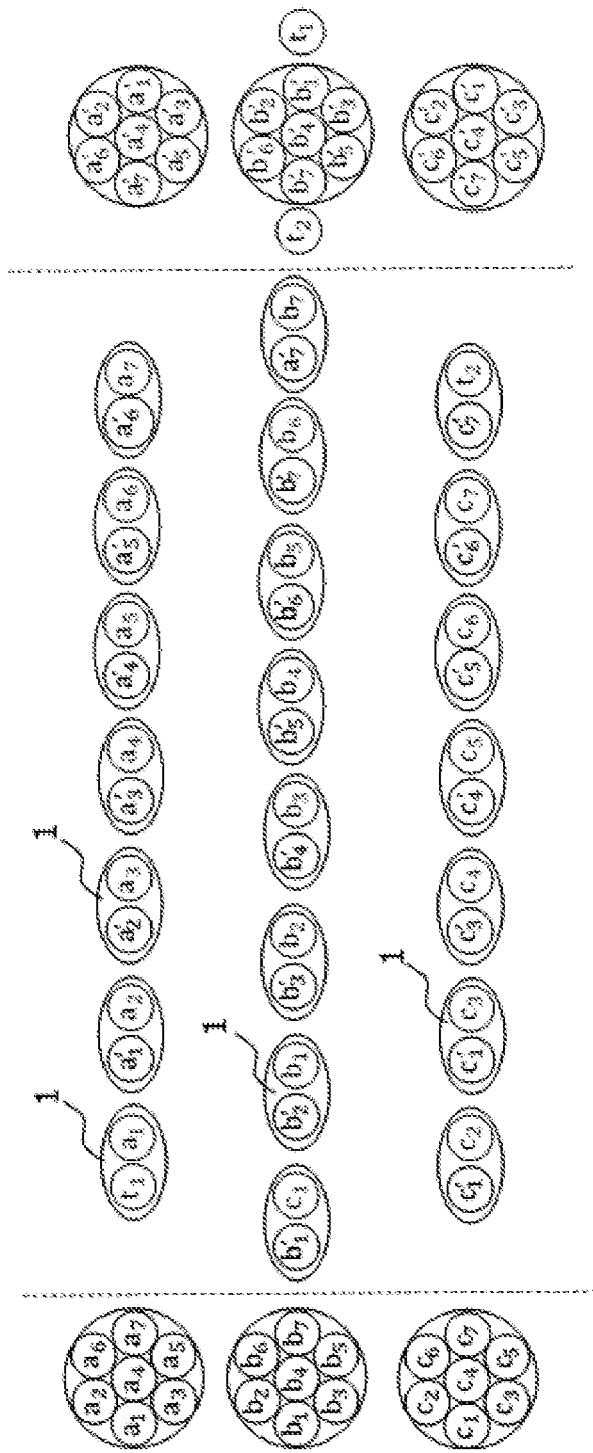
FIG. 11 schematically illustrates a possible connection scheme for the elementary wires of the cable of FIG. 3.

As indicated above, FIG. 4 summarizes the various steps implemented to allow conversion of one end of the cable 4 into a plurality of elementary superconducting wires able to be connected pairwise. The same steps are performed at the other end of the cable 4 so as to be able to make the final connections, for example by means of the connectors 1 of FIGS. 1 and 2, ending production of the superconducting loop between the two terminals $t_1$ and $t_2$. FIG. 11 schematically illustrates the overall connection scheme corresponding to the example of the cable 4 of FIGS. 3 and 4. In FIG. 11, the left-hand portion illustrates the three sub-cables A, B and C seen from one side of the cable 4, at the end of Phase 2 of the process of FIG. 4, whereas the right-hand portion illustrates the same sub-cables A, B, C seen from the other side of the cable 4, at the end of the same Phase 2. The central portion of FIG. 11 shows the distribution of the various elementary wires that is obtained at the end of Phase 4, and their connection, preferably by the connectors 1, in accordance with the aforementioned series. Once the loop has been produced, all the connectors and all the guiding and holding parts described above may be arranged in the same cryogenic connecting casing, the latter not only allowing a coolant to flow inside of the loop, but also the terminating terminals $t_1$ and $t_2$ to be electrically connected with a view to making a current flow through the loop.

Although the principle of producing a superconducting loop was described for a cable comprising three sub-cables A, B, C each comprising seven elementary superconducting wires, this principle remains valid whatever the number of sub-cables from which the cable is composed, and/or whatever the number of elementary superconducting wires 41 that each sub-cable A, B or C comprises. For a given number N of sub-cables from which a given cable is composed, the innovative principle consists in deploying the elementary wires of each sub-cable into N horizontal planes, with discrete transitions between these horizontal planes.

The invention claimed is:

1. An electrically connecting device comprising:
   a linking part defining an internal channel that opens onto the exterior of the linking part, said internal channel being able to receive two end segments of two superconducting wires; and
   an aperture in the external jacket of the linking part, said aperture being in communication with said internal channel in order to allow a brazing material in liquid form to be introduced into said internal channel around the two end segments of the two superconducting wires;
   characterized in that the linking part comprises a central elongate body, the internal channel extending in a straight line between a first open end and a second open end of the linking part, said ends being located on either side of the central elongate body, in that said internal channel is configured so that the two end segments of two superconducting wires lie parallel and in contact with each other in the internal channel over said segment of common length, and in that the internal channel has in cross section the shape of an eight.

2. The electrically connecting device according to claim 1, wherein the linking part is of integral construction and made of an electrically conductive material able to withstand a cryogenic temperature.

3. The electrically connecting device according to claim 2, wherein the linking part is made of copper.

4. The electrically connecting device according to claim 1, wherein said aperture is a slit extending over the central elongate body parallel to the internal channel.

5. The electrically connecting device according to claim 1, wherein the dimension of the cross section of the shape of an eight is substantially adjusted to the dimensions of the cross sections of the two end segments of the two superconducting wires.

6. The electrically connecting device according to claim 1, wherein the first open end and the second open end have an elongate cross section concentric with the cross section of the shape of an eight of the internal channel.

7. The electrically connecting device according to claim 6, further comprising two heat-shrinkable sleeves that are configured to sealably encircle the transition regions of two superconducting wires inserted into the first open end and the second open end.

8. The electrically connecting device according to claim 1, wherein said central elongate body is cylindrical.

9. The electrically connecting device according to claim 1, wherein the first open end and the second open end are located on either side of the central elongate body so that the internal channel is off-centre with respect to the longitudinal axis of the central elongate body.

10. The electrically connecting device according to claim 9, wherein the central elongate body comprises an additional channel lying parallel to the internal channel and opening onto the exterior at at least one of the two ends of the central elongate body.

11. The electrically connecting device according to claim 10, wherein the additional channel is configured to receive a heating cartridge.

12. The electrically connecting device according to claim 10, wherein the additional channel opens onto the exterior at both ends of the central elongate body.

13. The electrically connecting device according to claim 10, wherein said internal channel is positioned between said aperture and said additional channel.

14. A superconducting cable-based electrical circuit able to form a closed superconducting electrical loop comprising a superconducting cable comprising a plurality of superconducting elementary wires that extend longitudinally inside a cryogenic jacket, the superconducting elementary wires being connected in series by a plurality of electrically connecting devices according to claim 1 so as to each form one turn of the superconducting electrical loop.

* * * * *